United States Patent
Wedekind et al.

(10) Patent No.: US 8,702,389 B2
(45) Date of Patent: Apr. 22, 2014

(54) DEVICE FOR LOCKING A ROTOR BLADE OF A WIND TURBINE

(75) Inventors: Christian Wedekind, Norderstedt (DE); Ulf Goepfert, Rostock (DE); Ronny Wuensch, Neubukow (DE); Roberto Porstmann, Dresden (DE)

(73) Assignee: Nordex Energy GmbH, Norderstedt (DE)

( * ) Notice: Subject to any disclaimer, the term of this patent is extended or adjusted under 35 U.S.C. 154(b) by 1031 days.

(21) Appl. No.: 12/576,046

(22) Filed: Oct. 8, 2009

(65) Prior Publication Data
US 2010/0202884 A1     Aug. 12, 2010

(30) Foreign Application Priority Data
Feb. 12, 2009   (DE) .......................... 10 2009 008 607

(51) Int. Cl.
*F01D 7/00* (2006.01)
(52) U.S. Cl.
USPC ............................................ 416/26; 416/153
(58) Field of Classification Search
USPC ............................. 416/153, 147, 26, 46, 140
See application file for complete search history.

(56) References Cited

U.S. PATENT DOCUMENTS

| | | | | |
|---|---|---|---|---|
| 1,846,488 A | * | 2/1932 | Jackson | 416/153 |
| 3,003,567 A | * | 10/1961 | Flaugh et al. | 416/46 |
| 3,633,951 A | * | 1/1972 | Hinkle et al. | 403/83 |
| 5,554,003 A | * | 9/1996 | Hall | 416/140 |
| 6,428,274 B1 | * | 8/2002 | Hehenberger | 416/153 |
| 7,261,517 B2 | * | 8/2007 | Uphues et al. | 416/153 |
| 2008/0187440 A1 | * | 8/2008 | De Wilde | 416/31 |

FOREIGN PATENT DOCUMENTS

| | | |
|---|---|---|
| DE | 100 31 472 C1 | 4/2002 |
| DE | 10 2004 017 323 A1 | 3/2005 |
| DE | 20 2005 013329 | 2/2006 |
| EP | 1 029 176 B1 | 3/1998 |

* cited by examiner

*Primary Examiner* — Edward Look
*Assistant Examiner* — Aaron R Eastman
(74) *Attorney, Agent, or Firm* — Vidas, Arrett & Steinkraus

(57) ABSTRACT

A device for locking a rotor blade of a wind turbine which has an adjustment system for the blade pitch angle of the rotor blade, wherein the adjustment system has a drive which features a motor and a gearbox with an input shaft that bears an external toothing, characterized by a locking pin rotatably mounted around its longitudinal axis, which engages with the external toothing in a locking position, and releases the external toothing in an unlocked position, wherein the locking pin has an end portion whose free end stands eccentric to the longitudinal axis of the locking pin.

13 Claims, 4 Drawing Sheets

DEVICE FOR LOCKING A ROTOR BLADE OF A WIND TURBINE

CROSS-REFERENCE TO RELATED APPLICATIONS

Figure 1:
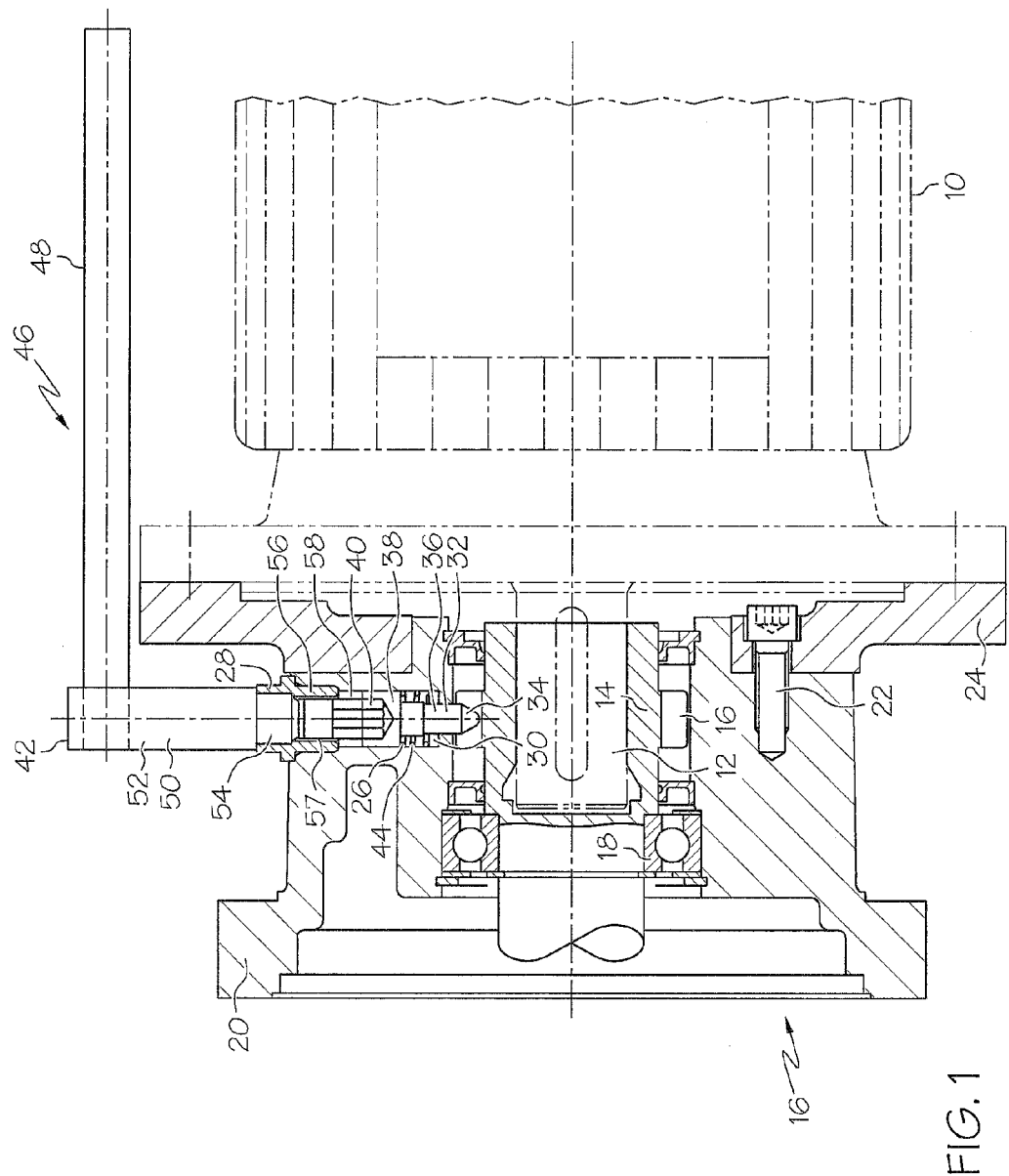

Not applicable.

STATEMENT REGARDING FEDERALLY SPONSORED RESEARCH

Not applicable.

BACKGROUND OF THE INVENTION

The present invention relates to a device for locking a rotor blade of a wind turbine which comprises an adjustment system for the blade pitch angle of the rotor blade. The adjustment system has a drive which comprises a motor and a gearbox, wherein a gearbox input shaft bears an external toothing.

DE 100 31 472 C1, the entire contents of which is incorporated herein by reference, discloses a device for locking a shaft of a wind turbine driven by a rotor. For locking, a toothed disc is provided on the driven shaft, which is realized as a toothed disc. A locking element has a projection which interacts with the two teeth of the toothed disc.

DE 10 2004 017 323 A1, the entire contents of which is incorporated herein by reference, discloses a locking device for holding the rotor blade in an adjusted angular position essentially free of clearance. The locking device has a tensioning slider and a tensioning device, wherein the tensioning device is coupled to the rotor blade and the tensioning slider is arranged stationarily on the rotor hub. In a predetermined angular position in which the rotor blade is to be locked, the tensioning device and the tensioning slider engage one with another, and lock the rotor blade.

A hydraulically actuated blade pitch adjustment device is known from DE 31 10 263 C2, the entire contents of which is incorporated herein by reference. In this document each of the blade roots is provided with a groove in its perimeter. A device for locking in the feathered position is arranged adjacent to the blade perimeter and comprises a locking element, which is biased towards the blade root by a spring. The locking element is actuated hydraulically and interacts with the groove on the blade root.

EP 1 029 176 B1, the entire contents of which is incorporated herein by reference, discloses, a wind turbine in which an adjustment of the rotor blade position is performed by a lock that can be activated when the power supply of the drive breaks down. In its activated condition, this lock prevents the rotation of the rotor blades, yet it permits to turn the rotor blades into the feathered position.

For wind turbines different maintenance operations must sometimes be performed on the rotor hub. In order to protect the maintenance operators from injuries by rotating parts, it is often also provided to fix the blades in their position via the brake of the drive motors, however this has the disadvantage that there is no positive fixation of the position and that it is not possible to fix the blades in their position during maintenance works on the brake.

The present invention is based on the objective to provide a locking device for a rotor blade of a wind turbine, which allows a reliable and effective fixation of the rotor blade in any arbitrary position by simple means.

BRIEF SUMMARY OF THE INVENTION

The device of the present invention serves for locking a rotor blade of a wind turbine. The wind turbine has an adjustment system for the blade pitch angle of the rotor blade. The blade pitch angle of the rotor blade is changed by a rotation of the rotor blade around its longitudinal axis. The adjustment system has a drive comprising a motor and a gearbox, wherein the output shaft of the motor is connected to the gearbox input shaft via a shaft-hub connection. The gearbox input shaft has an external toothing. According to the invention, a locking pin is provided rotatably mounted around its longitudinal axis, which engages with the external toothing in a locking position and releases the external toothing in its unlocked position. The locking pin has an end portion whose free end stands eccentric to the longitudinal axis of the locking pin. When the locking pin of the present invention is brought into its locking position, the end portion of the locking pin engages with the external toothing, and thus it locks the position of the rotor blade. The eccentrically formed end portion of the locking pin offers the advantage that when the free end of the locking pin hits a tooth of the external toothing, the free end can be rotated by the rotatable mounting of the locking pin, so that the free end of the end portion engages with the external toothing between the teeth. Due to the rotatable mounting of the locking pin, the point of the locking pin performs a circle arc shaped movement. Due to a forcible forward feed, this movement ensures that the free end engages with the interstice between two teeth. A high torque of an incident brake can also be overcome through this.

In a preferred embodiment of the device according to the present invention, the longitudinal axis of the locking pin is directed radially to the input shaft. As a consequence, the locking pin moves between its locking position and its unlocked position in radial direction.

In a preferred embodiment, the external toothing is realized as a V-toothing. The end portion of the locking pin has preferably a shape that matches with the V-toothing. By the matching forms of end portion and V-toothing, it is possible that the end portion of the locking pin interacting with the teeth distributes a part of the force on the side walls of the tooth flanks.

In a particularly preferred embodiment, in the locking position, the locking pin is arranged in a through bore which extends in a direction radial to the input shaft. The bore can have an internal thread on its end pointing away from the input shaft. Alternatively, it is also possible that a sleeve with an internal thread is inserted into the bore at the end pointing away from the input shaft.

In a particularly preferred embodiment, the locking pin is arranged in the bore even in the unlocked position, and is biased into its unlocked position by a spring element. The particular advantage of this embodiment is that due to the spring mechanism, the locking pin is kept away from the external toothing, and unintended locking is prevented by this.

The locking pin has particularly preferably a head portion which is provided for a positive connection with a head of an operating tool. For instance, this may be an external hexagon socket or an internal hexagon socket.

In an advantageous embodiment of the invention, the operating tool has a longitudinal portion with an external thread, on whose end the tool head for positive connection with the locking pin is provided. The tool head has a diameter which is smaller than the internal diameter of the bore and the sleeve, and the external thread corresponds to the internal thread that is provided in the sleeve and/or in the projection. In the operation, the operation tool is screwed into the bore or the sleeve. The head of the operation tool engages with the rotatably mounted locking pin in the bore, and turns it into the locking position. The eccentric end portion describes a helical movement in this, so that the locking pin can engage between two teeth.

Whereas in the first embodiment described above, the locking pin remains in the bore even when it is in the unlocked position, the locking pin is connected to a locking tool in the second embodiment. The locking tool has a longitudinal portion with an external thread that corresponds to the internal thread of the bore or the sleeve, respectively. In the operation of the locking tool, the locking tool is screwed into the existing internal thread with its external thread, and so it moves into its locking position.

Preferably, the tool is screwed into the internal thread in the locking position, and the end portion of the locking tool engages into the external toothing.

BRIEF SUMMARY OF THE DESCRIPTIONS OF THE DRAWINGS

The present invention will be explained in more detail in the following, by means of two examples of its realisation.

Figure 2:
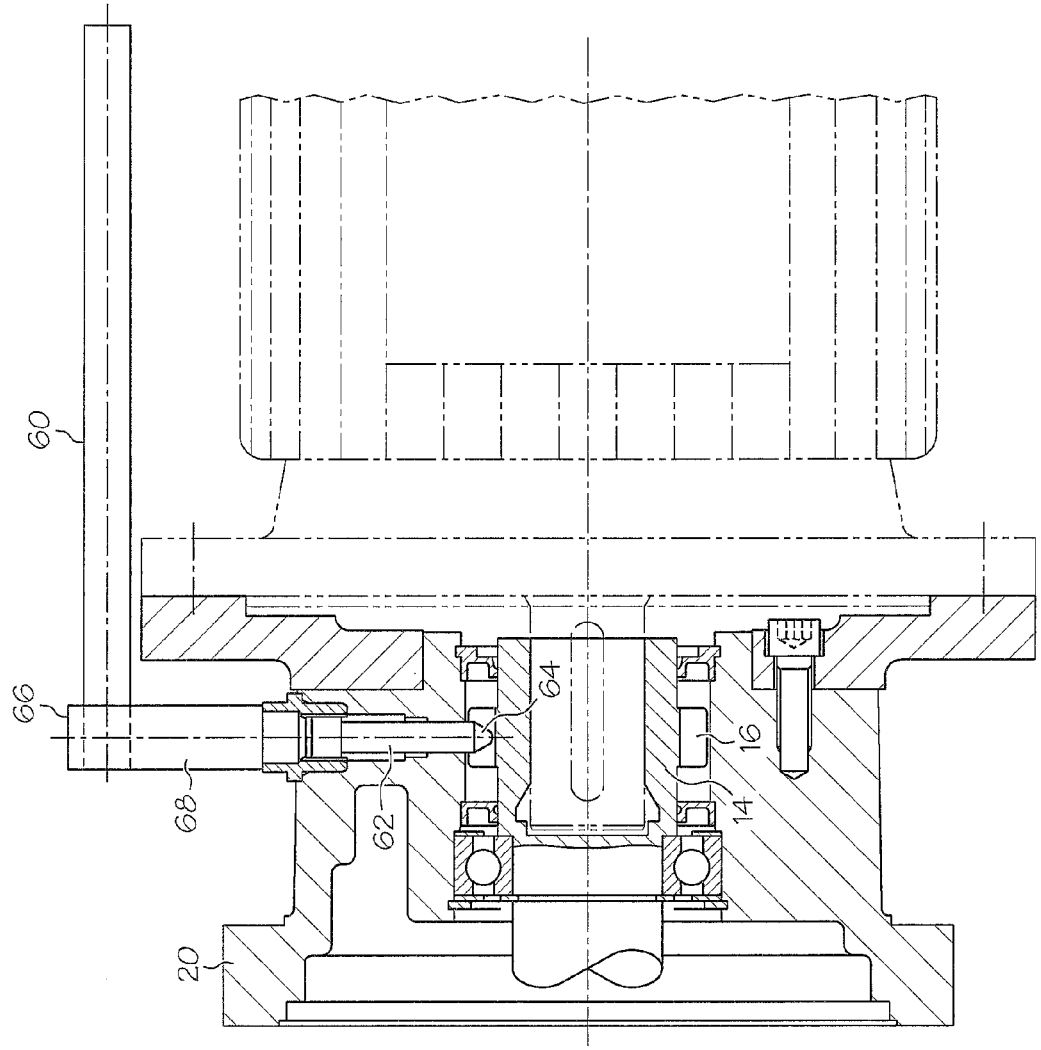
Figure 3:
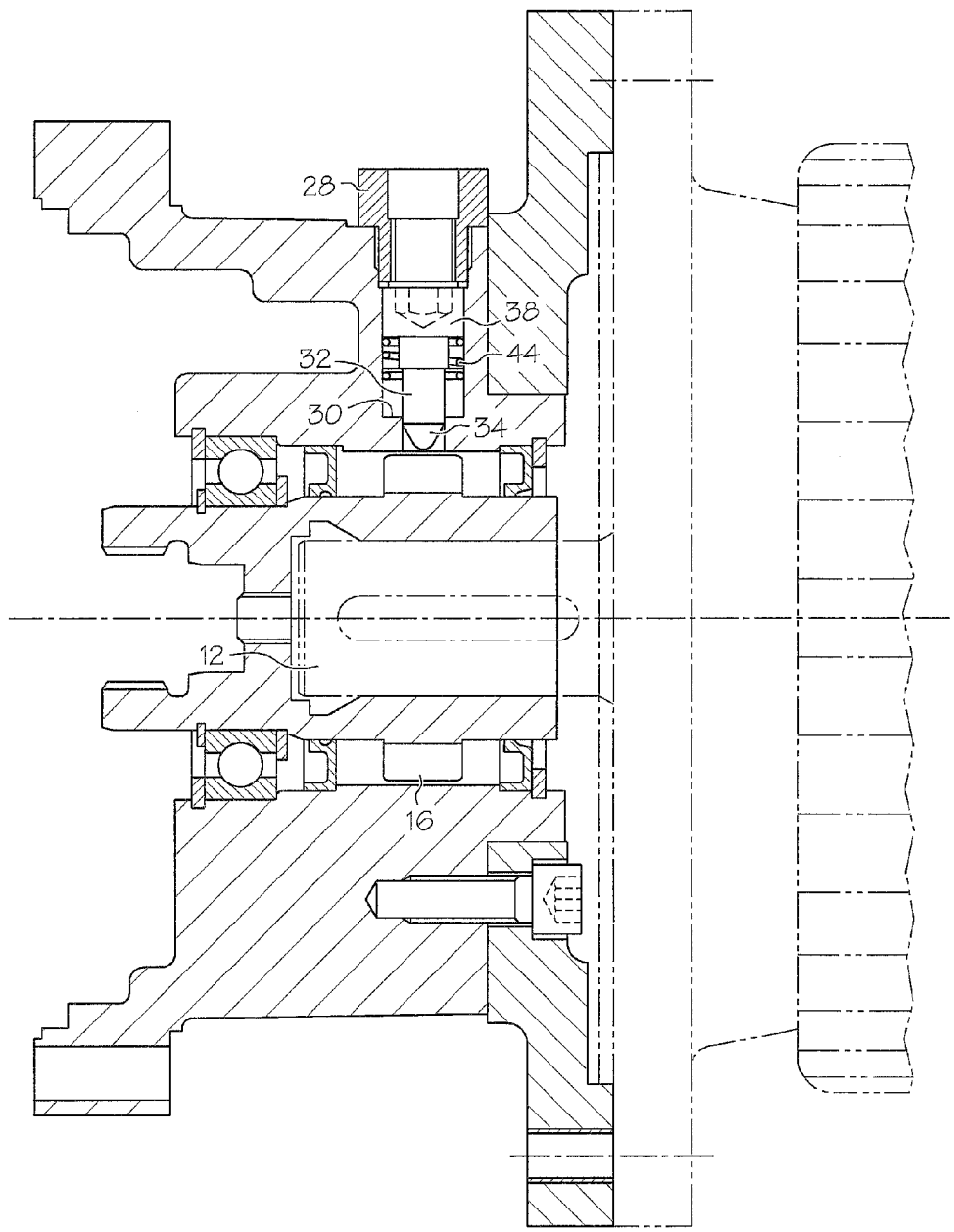
Figure 4:
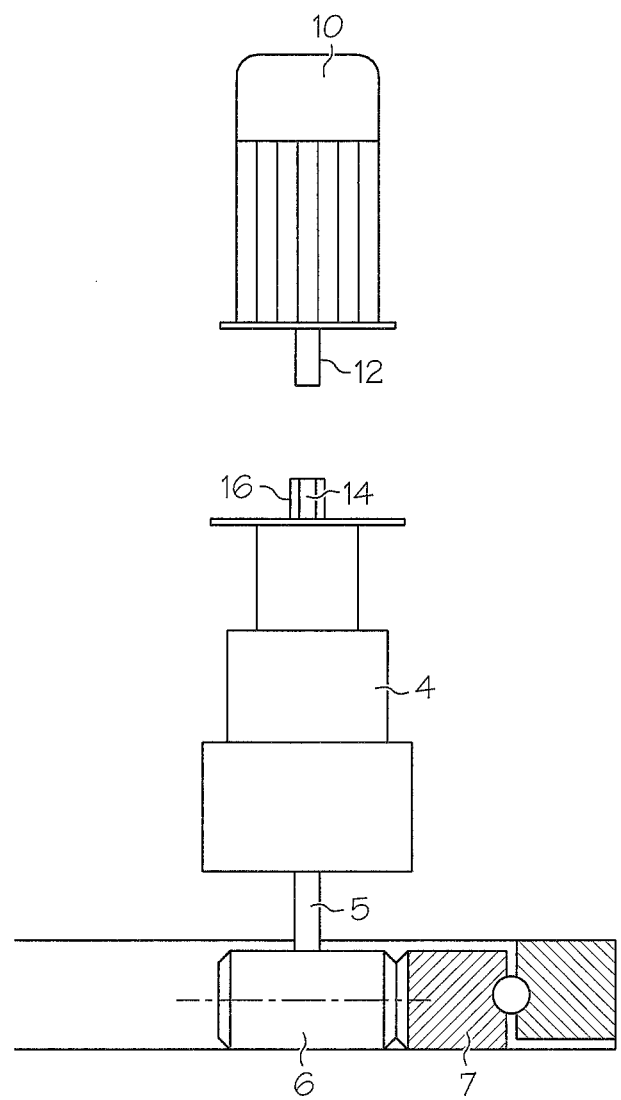

FIG. 1 shows a cross section through a locking device, in which the locking pin remains permanently in a bore, and the locking pin as well as its tool are realized in two pieces, FIG. 2 shows a cross section of a locking device, in which the locking pin is formed in one piece with the locking tool, FIG. 3 shows the locking device of FIG. 1 in an enlarged view, with a retracted locking pin, and FIG. 4 shows an overview sketch of a pitch drive for the locking device.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated FIG. 1 shows the locking device in a side view. The motor 10 is screwed to the gearbox input flange 24, which is in turn connected to the gearbox casing 20 via screws 22. The gearbox input shaft 14 is mounted in the gearbox casing via the bearing 18. The output shaft 12 of the motor 10 is coupled to the gearbox input shaft 14 via a shaft-hub connection. The external toothing 16 located on the gearbox input shaft is realized as a V-toothing.

The gearbox casing 20 has a bore 26 pointing radially to the rotational axis of the shaft 12, into which a sleeve 28 is inserted from the outside. The sleeve 28 has an external thread, by way of which the sleeve 28 is screwed into a corresponding internal thread of the bore 26. On its end pointing to the external toothing 16, the bore 26 has a shoulder 30, in which the inner diameter tapers.

A locking pin 32 is inserted into the bore 26, which has an end portion 34, a shaft 36 and a head portion 38. The head portion 38 has a hexagon socket 40 for receiving a tool head.

The end portion 34 of the locking pin 32 has a rounded point, which is arranged in an offset with respect to the longitudinal axis 42 of the locking pin. As can be recognised in FIG. 1, the eccentric end portion 34 interacts with the two teeth of the external toothing 16.

The locking pin 32 is mounted in the bore 26 via a spring 44. The spring 44 sits close to that side of the head 38 of the locking pin which points to the input shaft, and pushes the same out of the locking position shown in FIG. 1. Using same reference signs, FIG. 3 shows the locking pin 32 in its position that is pushed back by the spring 44.

A tool 46 has a stick 48, which can be equipped with a handle on its one end. The stick 48 is connected to a tool stick 50 at an angle of 90 degrees. The tool stick 50 has an upper portion 52, whose external diameter is approximately corresponding to the diameter of the inserted sleeve 28. A portion 54 joins this portion 52 and has a smaller diameter. The portion 56 is provided with an external thread 57 which co-operates with a thread of the sleeve 28. A tool head 58 joins the threaded portion 56 and engages with the locking pin.

When the tool 46 is used, it is screwed into the sleeve 28 with its threaded portion 56. When being screwed in, the tool head 58 engages with the locking pin and moves it into the locking position by continued screwing in a rotating and forward movement generated by the threaded portion against the spring force 44. In this, the end 34 of the locking pin performs a helical movement which ensures that the locking pin does not rest on the tip of a tooth of the external toothing 16, but interacts with the two teeth thereof.

A particular advantage of the locking device shown in FIG. 1 is that locking can be performed in every arbitrary position of the rotor blade or of the input shaft, respectively. Locking is possible even if the brake of the gearbox drive is locked, because any manual rotation of the rotor blade into a predetermined position is not necessary. With the aid of the tool, the braking torque of the brake can be overcome and the shaft can be pushed into the correct position. Moreover, in the practical use it can be easily ensured that locking is performed on one rotor blade only, and that several rotor blades are not locked unintentionally. For this purpose, it is necessary that only one operation tool 46 exists in one wind turbine. Furthermore, by the tool 46 it can be recognised easily by the maintenance operators that a rotor blade is locked.

FIG. 2 shows an alternative embodiment of the locking device. The main difference with respect to the embodiment of FIG. 1 is that the locking tool 60 is made in one piece with the locking pin 62. The locking pin 62 has an eccentric point on its end 64, whose free end is offset against the longitudinal axis 66. The tool has an angled shaft 68, which is screwed into a sleeve 28 by an external thread 70. Adjoining to the threaded portion of the shaft 68 follows the locking pin 62, which is guided within a bore in the gearbox casing 20. FIG. 2 shows the locking position, in which the end of the locking pin 62 interacts with the two teeth of the external toothing 16.

Also in this embodiment, the described advantages of the invention are evident. In particular, it is possible to lock the rotor blade in any arbitrary position, so that it is no more necessary to adjust the rotor blade manually for locking it. Because the locking tool 60 is removed from the gearbox casing together with the locking pin, it is ensured that an unintented locking of the rotor blade does not take place.

FIG. 4 shows an overview sketch of the construction of a pitch drive for the locking device described above. The pitch drive consists of the motor 10 with its output shaft 12. The motor output shaft 12 is coupled to a gearbox input shaft 14. The gearbox input shaft 14 bears the external toothing 16. A pinion 6 is actuated by way of a gearbox 4 with a gearbox output shaft 5. The pinion 6 meshes in an internal toothing of a pitch bearing 7, by which the rotor blade can be adjusted in its position. In this, the locking device of the present invention sits between motor and gearbox and engages with the external toothing 16 of the gearbox input shaft 14.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A device for locking a rotor blade of a wind turbine which has an adjustment system for the blade pitch angle of the rotor blade, wherein the adjustment system has a drive which comprises a motor and a gearbox with an input shaft that bears an external toothing, characterised by a locking pin (32; 62) mounted rotatably around its longitudinal axis, which engages with the external toothing (16) in a locking position, and releases the external toothing (16) in an unlocked position, wherein the locking pin has an end portion (34; 64) whose free end stands eccentric to the longitudinal axis (42; 66) of the locking pin.

2. The device according to claim 1, characterised in that the longitudinal axis of the locking pin stands radially to the input shaft.

3. The device according to claim 1, characterised in that the external toothing (16) has a V-toothing.

4. The device according to claim 3, characterised in that the end portion of the locking pin features a shape that matches with the V-toothing.

5. The device according to claim 4, further wherein the locking pin enters its locking position between the V-toothing by movement in its longitudinal direction and by rotating the locking pin to dip into the V of the V-toothing.

6. The device according to claim 1, characterised in that in the locking position, the locking pin is arranged in a through bore which extends in a direction radial to the input shaft.

7. The device according to claim 6, characterised in that the bore has an internal thread on its end pointing away from the input shaft.

8. The device according to claim 6, characterised in that a sleeve (28) with an internal thread is inserted into the bore at the end pointing away from the input shaft.

9. The device according to claim 1, characterised in that in the unlocked position, the locking pin is arranged in a bore, and is pushed into its unlocked position by a spring element (44).

10. The device according to claim 9, characterised in that the locking pin has a head portion which is provided for a positive connection with a head of an operating tool.

11. The device according to claim 10, characterised in that the operating tool has a shaft (50) with an external thread, on whose end the head is provided, wherein the head has an external diameter which is smaller than an internal diameter of the bore and a sleeve, and that the external thread engages with the internal thread of the sleeve or the bore.

12. The device according to claim 1, characterised in that the locking pin is joined in one piece to a locking tool (60) which has a shaft (68) with an external thread that corresponds to an internal thread of a bore and/or a sleeve.

13. The device according to claim 12, characterised in that the locking tool is screwed into the internal thread in the locking position, and the end portion of the locking pin engages with the external toothing.

* * * * *